United States Patent
Takayasu

(10) Patent No.: US 6,732,925 B1
(45) Date of Patent: May 11, 2004

(54) CARD PROCESSING DEVICE AND CARD PROCESSING METHOD

(75) Inventor: Mitsuru Takayasu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/514,158

(22) Filed: Feb. 28, 2000

(30) Foreign Application Priority Data

Jan. 24, 2000 (JP) ........................................ 2000-014722

(51) Int. Cl.⁷ ................................................ G06K 7/08
(52) U.S. Cl. ...................................... 235/451; 235/459
(58) Field of Search ............................... 235/492, 451, 235/459, 462.14, 462.715, 472.01

(56) References Cited

U.S. PATENT DOCUMENTS

| | | | | |
|---|---|---|---|---|
| 5,625,534 A | * | 4/1997 | Okaya et al. | 361/686 |
| 6,070,794 A | * | 6/2000 | Niwata et al. | 235/380 |
| 6,075,860 A | * | 6/2000 | Ketcham | 380/25 |
| 6,123,259 A | * | 9/2000 | Ogasawara | 235/380 |
| 6,149,063 A | * | 11/2000 | Reynolds et al. | 235/472.02 |
| 6,172,673 B1 | * | 1/2001 | Lehtimen et al. | 345/327 |

FOREIGN PATENT DOCUMENTS

JP 622032264 * 7/1987 .......... G06K/15/30

* cited by examiner

Primary Examiner—Daniel St. Cyr
(74) Attorney, Agent, or Firm—Westerman, Hattori, Daniels & Adrian, LLP

(57) ABSTRACT

A card processor having a diagnosis process that can be started easily. A card processor comprising a card insert port (4), card moving unit (22 to 25), detection unit (13), a card reading unit (16, 17), power switch (2), and control unit (43). This control unit (43) determines from the detection unit (13) whether a card has been inserted when the power is turned ON by the power switch (2), and when a card has been inserted, it starts diagnosis processing, and when a card has not been inserted, it proceeds to normal processing. Since it is possible to start diagnosis processing by turning ON the power and inserting a card, it is possible for diagnosis processing to be started by anyone, and not just specially trained operators and personnel.

10 Claims, 9 Drawing Sheets

CARD PROCESSING DEVICE AND CARD PROCESSING METHOD

BACKGROUND OF THE INVENTION

1. Field of the Invention

The present invention relates to a card processing device and card processing method for moving a card and communicating with the card, and in particular to a card processing device and card processing method for diagnosing by using the card.

2. Description of the Prior Art

Recently, systems that use cards are becoming popular. These cards include magnetic cards, IC cards, optical cards, etc. Moreover, the methods of use include, credit cards, pre-paid cards, debit cards, or individual ID card, or special-use cards for performing management or maintenance of equipment or systems.

These kinds of cards are rapidly increasing and becoming very widely used in industries such as financial, manufacturing and service industries. Therefore, devices for reading and writing this kind of card data are also rapidly increasing and spreading over many various industries.

Card processors are being used in accordance to the type of card as follows. At small stores and businesses, one or two credit card or pre-paid card processors are located at every store, while at large stores such as department stores or supermarkets there is a processor in each sales department or for each cash register.

There are also many examples of ID card processors being used for time-card management systems, entrance management gate systems, and the like and set up in companies, factories, departments or office floors. Often there are one or two separate machines for each location.

Moreover, special-purpose card processors for equipment and system management, maintenance and the like, are located in the proximity of equipment and used for entering specific kinds of data and data for each individual equipment.

The use of card processors is widely spreading in this way, and they are being set up as described above at each individual location. Also, each card device is managed and maintained by the respective users. These card devices are equipped with self-diagnosis functions, and the devices are diagnosed by diagnosis function.

The following kinds of diagnosis methods have been proposed as diagnosis technology for these kinds of card devices. A first prior technology uses a special data diagnosis card for performing diagnosis according to the data of the card used of a system where the processing contents of the card processor changes (for example Japanese patent No. 2720936).

A second prior technology is for a taxi card system where diagnosis of the card device is started by operating specific keys on a keyboard (for example Japanese examined patent No. H7-43784).

However, the prior technology has the following problems.

(1) In the first prior technology it is necessary to use a specific card for diagnosis of the equipment. This special diagnosis card must be carefully handled so as not to mistake it for other cards, and it is usually stored in a locked storage box. Therefore, special card storage and management are necessary, and the operator or management and maintenance personnel who handle the card must receive training. Particularly, as the spread and volume of card processors rapidly increases, the equipment operator or management and maintenance personnel must be retrained for equipment diagnosis, and this personnel training requires time and money.

(2) In the second prior technology, diagnosis of the card device is started by operating specific keys on a keyboard, so complicated keyboard procedures are required. Therefore, it is necessary to train the operator or management and maintenance personnel of the complicated keyboard procedures. Similarly, the operator or management and maintenance personnel must be retrained for equipment diagnosis, and this personnel training requires time and money.

(3) Furthermore, for card data reading errors that occur in diagnosis processing due to the combination of card and card processor, a problem occurs in that it is not possible to distinguish whether the error is due to the card or the processor.

SUMMARY OF THE INVENTION

The objective of this invention is to provide a card processing device and card processing method for reading or writing card data where easily not only trained operators and personnel but all operators can operate a diagnose of the device.

Another objective of this invention is to provide a card processing device and card processing method for starting diagnosis by a simple operation without the use of a special card.

Moreover, another objective of this invention is to provide a card processing device and processing method for starting diagnosis by a simple operation without complicated procedures such as the use of certain keys.

Furthermore, another objective of this invention is to provide a card processing device and processing method for identifying the cause of card data reading errors during diagnosis.

In order to accomplish the objectives of this invention, the card processing device of one feature of this invention comprises a card insert port, means for moving a card, detection means for detecting the card at the card insert port, means for reading data on the card, a switch for turning on power to the device, and a control unit for selectively executing normal processing of moving the card that is inserted from the card insert port and reading the card data, or diagnosis processing which performs diagnosis of the device. When the detection means detects a card when the switch is turned ON, the control unit executes the diagnosis processing, and when the detection means does not detect a card when the switch is turned ON, the control unit executes the normal processing.

The card processing method of one feature of this invention comprises a step of determining whether the detection means located in the proximity of a card insert port detects a card when power on, a step of moving the card that is inserted from the card insert port, reading the card data and performing diagnosis of a device when the detection means detect a card, and a step of moving the card that is inserted from the card insert port, reading the card data and performing normal processing when the detection means do not detect a card.

In this feature of the invention, it is possible to perform diagnosis of the device from normal processing by pressing a switch after inserting the card, so diagnosis can be started without a special card or a complicated procedure.

Therefore, it is possible for people other than specially trained operators and personnel to start diagnosis easily, so special operators or personnel are not necessary.

In the card processing device of another feature of the invention, the control unit switches to normal processing when the card does not move inside the processor ever after a set amount of time elapses after the detection means detects the card.

In the card processing method of another feature of the invention, the diagnosis step comprises a step of switching to normal processing when the card does not move inside the device even after a set amount of time elapses after the detection means detects the card.

In this feature, once flow of diagnosis processing of the device is advanced after a sensor near the card inlet port detects the card, however it is only possible to limit the operating time for diagnosis processing within a specified time. Therefore, it is possible to return the normal processing even though error operation. Moreover, the motor idles for a long time when the card does not move inside the device after the specified time elapses and unnecessary operation continues, however it is also possible to prevent this.

In the card processor of another feature of this invention, the control unit performs diagnosis processing when the detection means at the card insert port detects a card, and performs normal processing when the detection means does not detect a card after execution of diagnosis processing.

The card processing method of another feature of the invention, comprises a step of determining whether or not the detection means at the card insert port detects a card after execution of diagnosis processing, and a step of performing diagnosis processing when the card is detected, and for performing normal processing when the card is not detected.

This feature has a function capable of selecting a plurality of processes for performing diagnosis processing of the device when the sensor at the card insert port detects a card again after execution of diagnosis processing, and for performing normal transaction processing when the sensor does not detect a card. This makes it possible to continuously execute diagnosis more than one time, so it is possible to obtain more accurate diagnosis results.

The card processing device of another feature of the invention comprises means for displaying the diagnosis results.

The card processing method of another feature of the invention comprises a step of displaying the diagnosis results.

In this feature, the card processing device displays the diagnosis results so the operator can easily check the results.

The card processing device of another feature of the invention comprises a card insert port, means for moving a card, detection means for detecting the card, means for reading data contained on the card, and a control unit for moving the card that is inserted from the card insert port, reading the card data and selectively executing normal processing for moving the card that is inserted from the card insert port and reading the card data and selectively executing device diagnosis. This control unit determines whether there is processor error or card error according to a plurality of diagnosis results from a plurality of different cards.

The processing method of another feature of this invention comprises; a first step of inserting a first card into a card insert port; a first diagnosis step of moving the first card that is inserted into the card insert port, reading the data on the first card and performing diagnosis of the device; a second step of inserting a second card into a card insert port, a second diagnosis step of moving the second card that is inserted into the card insert port, reading the data on the second card and performing diagnosis of the device; and a step of determining whether there is processor error or card error according to the first and second diagnosis results.

In this feature, it is possible to distinguish whether the cause of communication error between a card and device is due to a card error or a processor because diagnosis is performed more than once using different cards. Therefore, it is possible to obtain even more accurate diagnosis results.

Other features and advantages of the present invention will become readily apparent from the following description taken in conjunction with the accompanying drawings.

DESCRIPTION OF THE PREFERRED EMBODIMENTS

The preferred embodiments of the invention will be explained with reference to the drawings and in the order of the card processing device, card processing method and other embodiments.

Figure 1:
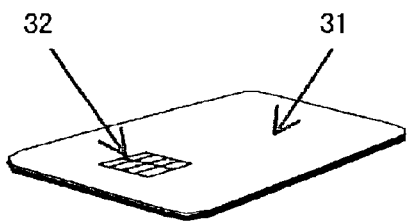
FIG. 1 is a pictorial view of the card used in an embodiment of the invention.
Figure 2:
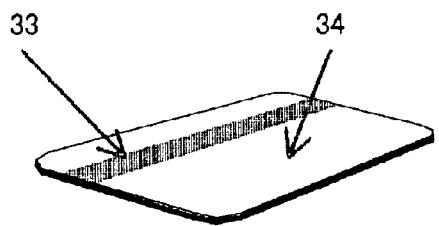
FIG. 2 is a pictorial view of another card used in an embodiment of the invention.
Figure 3:
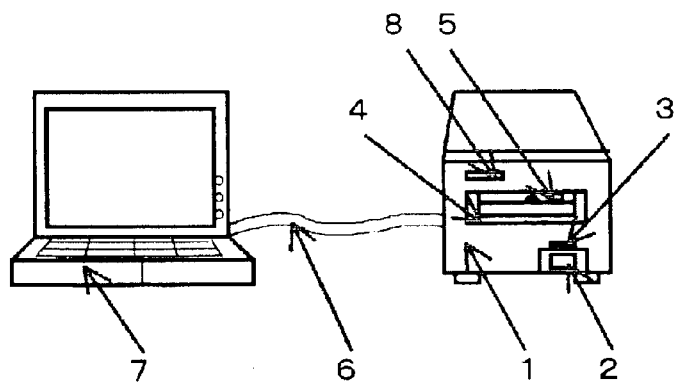
FIG. 3 is a configuration diagram of the card system of an embodiment of the invention.

Card Processing Device:

FIG. 1 and FIG. 2 show the external appearance of the cards used in an embodiment of the invention, and FIG. 3 is a configuration drawing of the card system of an embodiment of the invention.

As shown in FIG. 1 and FIG. 2, cards that are applicable in this invention correspond to ISO7816 or other modified format. FIG. 1 shows an IC card comprising an IC chip on part of the card 31 and a terminal 32 for transmitting and receiving data. The IC chip is embedded inside the card 31 and is not shown in the figure.

FIG. 2 shows a magnetic card having a magnetic strip 33 on part of the card 34. The card may also have a magnetic recording layer on the entire surface of the card 34, such as a pre-paid card. Moreover, the card may have both a magnetic strip and IC chip. Furthermore, the card may also be a read/write optical card.

FIG. 3 shows the card system, and is an example of connecting the card device with a control computer. The card device 1 is connected to the computer 7 with a cable 6 by way of a connector not shown in the figure. Also, the card device 1 or computer 7 is connected to a commercial power supply by a power cable not shown in the figure. When a battery is used, it is not necessarily connected to a commercial power supply.

When performing card processing, a "Read" command is sent from the computer 7, and the card device 1 takes in the card, reads the data and transmits the data. The card is ejected when the computer 7 sends an "Eject" command. Also, when necessary, data are written to the card, as well as read and transmitted, by a data "Write" command.

The card device 1 has a power ON/OFF switch 2, Power ON display lamp 3, and card insert port 4. The configuration of the mechanism for processing the card that has been inserted from the card insert port 4 is explained with FIG. 4. The lamp 5 is a display lamp for indicating when it is okay to insert the card into the card insert port 4. The cable 6 is any cable that allows signals, commands and data to be transmitted between the card device 1 and computer 7, and RS-232C or other serial or parallel transmission is possible. Lamp 8 is a display lamp that is not used in prior device and is used in this embodiment for displaying the diagnosis result.

Figure 4:
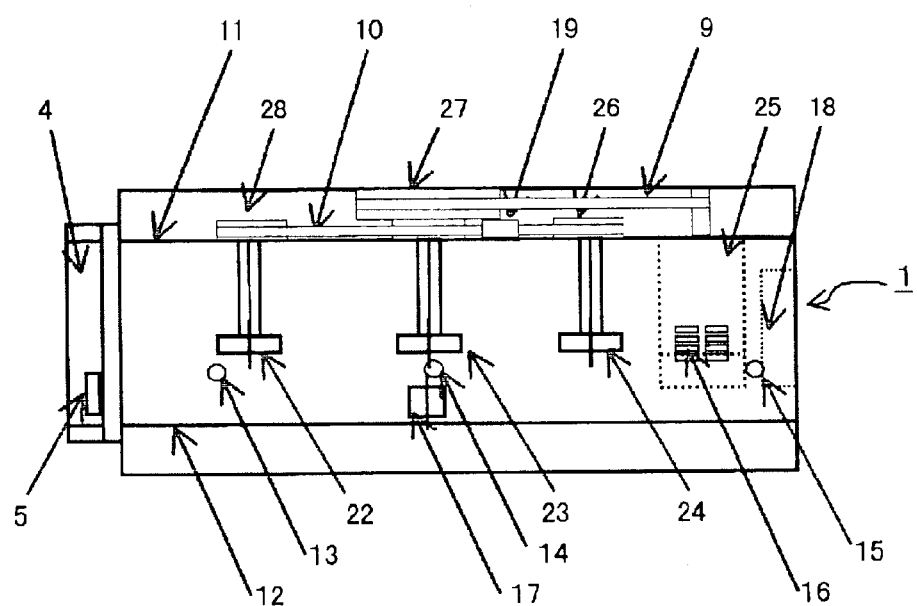
FIG. 4 is a configuration diagram of the card device of an embodiment of the invention.

FIG. 4 is a configuration diagram of the card device of FIG. 3, and explains the configuration of the mechanism in an easy-to-understand way. The card insert port 4 is where the card is inserted into the card device 1 and where it is ejected after card processing has ended. The operation of each of the components will be explained below. Normal card operation is as follows.

The card is inserted into the card insert port 4 when the card insertion lamp 5 goes ON. The card is inserted by hand, and detected by a sensor S1 (13), and then the motor 25 begins to operate. When the motor 25 begins to operate, belts 9 and 10, and belt pulleys 27, 28, 26 also begin to operate and cause card drive rollers 22, 23 24 to operate.

When these drive rollers 22, 23, 24 begin to operate, the card is held between them and the follower rollers that face them (not shown in the figure) and is moved forward. When the card moves forward, it passes by sensor S2 (14) and sensor S3 (15). A card stopper 18 is located such that the trailing end of the card does not leave the roller 24 after sensor S3 (15) detect the front end of the card.

The distance between sensor S1 (13) and sensor S2 (14), and the distance between sensor S2 (14) and sensor S3 (15) are shorter than the length of the card, so that when the card is inside the card device it can always be detected by a sensor.

A contact 16 is located inside the device such that after the card moves forward and stops at the card stopper 18, the terminal 32 on the IC card 31 (see FIG. 1) faces the contact 16 and makes a connection. The card terminal 32 and card device are connected electrically at contact 16 for sending and receiving data.

Moreover, the magnetic head 17 is provided for reading/writing data on the magnetic strip 34 (see FIG. 2) on the magnetic card 33 fed into the device. In a special IC card device, there is provided only the aforementioned contact 16 to the device, and in a special magnetic card device, there is provided only the aforementioned magnetic head 17. Furthermore, in a card device for both IC cards and magnetic cards, there are both.

The commands for data transmission include "Read", "Write" and card "Eject" commands from the computer 7, and the card device returns responses for the respective commands. When the card device 1 receives the card "Eject" command, the motor 25 rotates in the reverse direction, and the card is held between the rollers 22, 23, 23 and the follower rollers that face them and is moved to the card insert port 4 and ejected. When the trailing end of the card (end toward the rear of the processor) moves away from the sensor S2 (14), rotation of the motor 25 stops.

The card is carried by inertia to a position where the front end of the card can be easily removed by hand from the card insert port 4. At this point the card is still held by the roller 22, so sensor S1 (13) is still able to detect the card and can detect when the card is removed.

Figure 5:
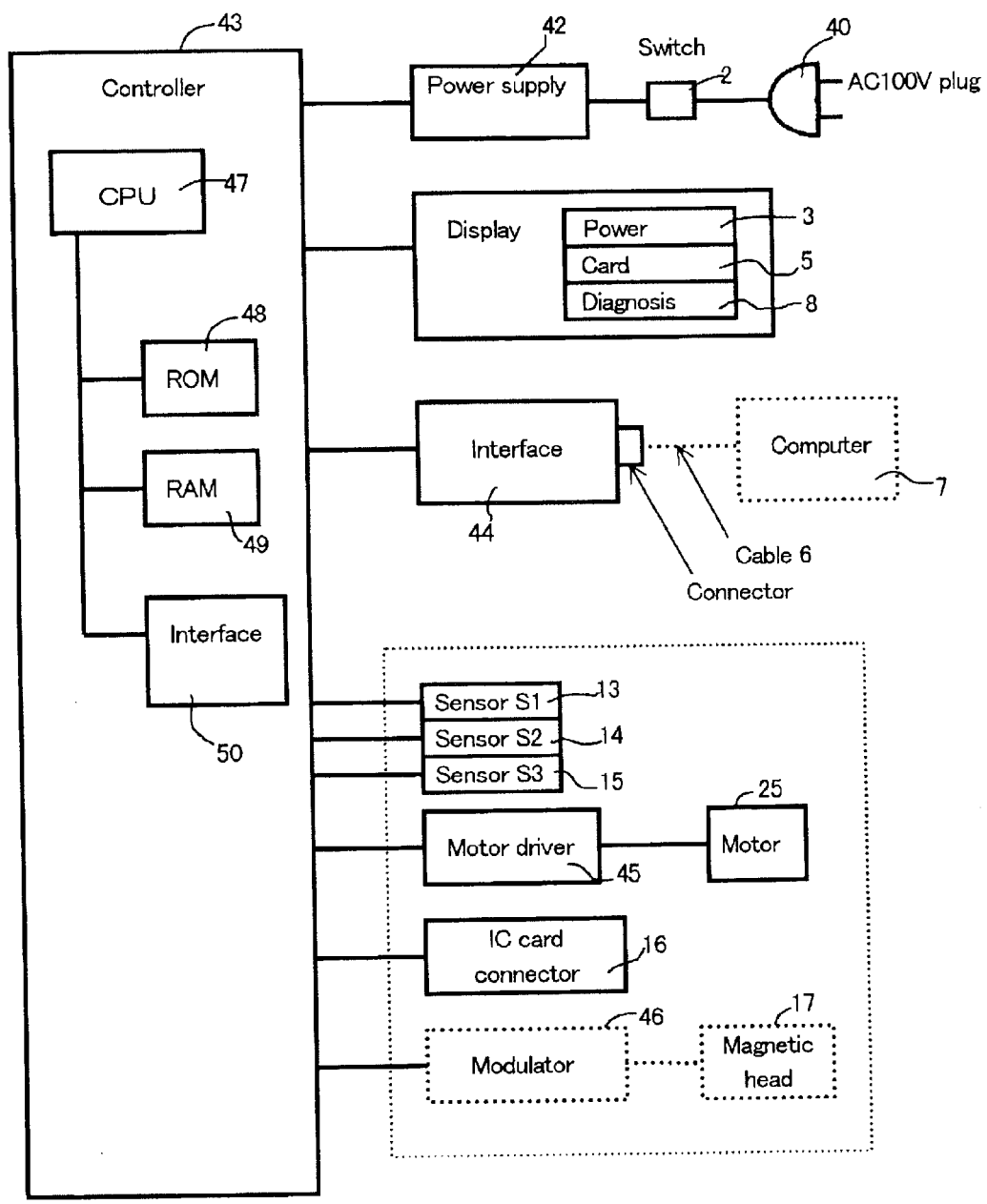
FIG. 5 is a block diagram of the card device of an embodiment of the invention.

FIG. 5 is a block diagram showing the control of the card device in FIG. 3. The same symbols used for FIG. 3 and FIG. 4 are used for identical components. As shown in the figure, the electrical components of the card device comprise a control unit 43, plug 40, power supply 42 with power switch 2, display, interface unit 44, and mechanism unit. The power supply 42 converts the commercial power supply (100V AC) to a direct-current power supply.

The display comprises a power ON lamp 3, and card insert display 5. Furthermore, in this embodiment, it has a display lamp 8 for displaying the diagnosis result. When an error is confirmed, this diagnosis result display lamp 8 lights up orange. When there is no error and operation is proper, the lamp 8 lights up green. This display lamp may be combined with another display as long as it is possible to accurately check the diagnosis result.

The interface unit 44 has a connector for connecting to the computer 7 and is used for transmitting data. The mechanism unit comprises the electrical components of the mechanism shown in FIG. 4. The card insert lamp 5 in FIG. 4 is included inside the display in FIG. 5 in order to make the explanation easier to understand.

The mechanism unit comprises sensors S1 (13), S2 (14), S3 (15), motor 25 and motor drive unit 45 and contact 16 for the connecting with the IC card. In a magnetic card device, provided a magnetic head 17 and a demodulation circuit 46. There is no contact 16 for an IC card in a device that does not process IC cards.

The sensors S1 (13), S2 (14), S3 (15) can be a LED or photosensor pair that function as a light-emitting element and light receiving element. These sensors electrically detect the amount of light passing the card to detect whether or not there is a card. These sensors S1 (13), S2 (14), S3 (15) do not have to be optical sensors as described above, but can be microswitches or contacts capable of detecting the position of the card.

The control unit 43 comprises a CPU (central processing unit) 47, ROM (read only memory) 48, RAM (Random Access Memory) 49, and peripheral interface 50. The peripheral interface 50 controls the sensor input, motor-drive output, IC-card contact input/output, magnetic head demodulation circuit input, interface unit 44 input/output, and display output. The power supply for the control unit 43 is supplied from the power-supply unit 42. The CPU 47 can be a general-purpose or special-use CPU.

The ROM 48 is explained later using FIG. 6 and is used for storing in advance the software for executing card processing for the card device. The CPU 47 executes the software. The RAM 49 is used for temporarily storing necessary processes and data that are required for executing the software.

This card device is configured for processing both IC cards and magnetic cards, however an IC-card-only device, magnetic-card-only device or optical card device are also possible.

Figure 7:
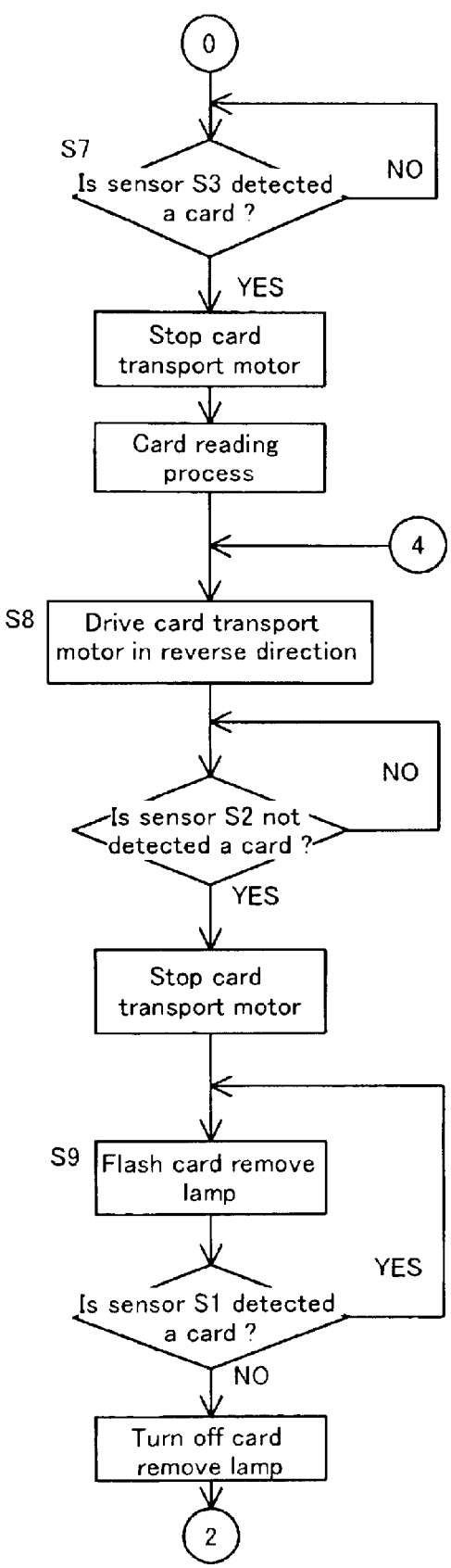
FIG. 7 is a second flowchart of the card processing of an embodiment of the invention.
Figure 8:
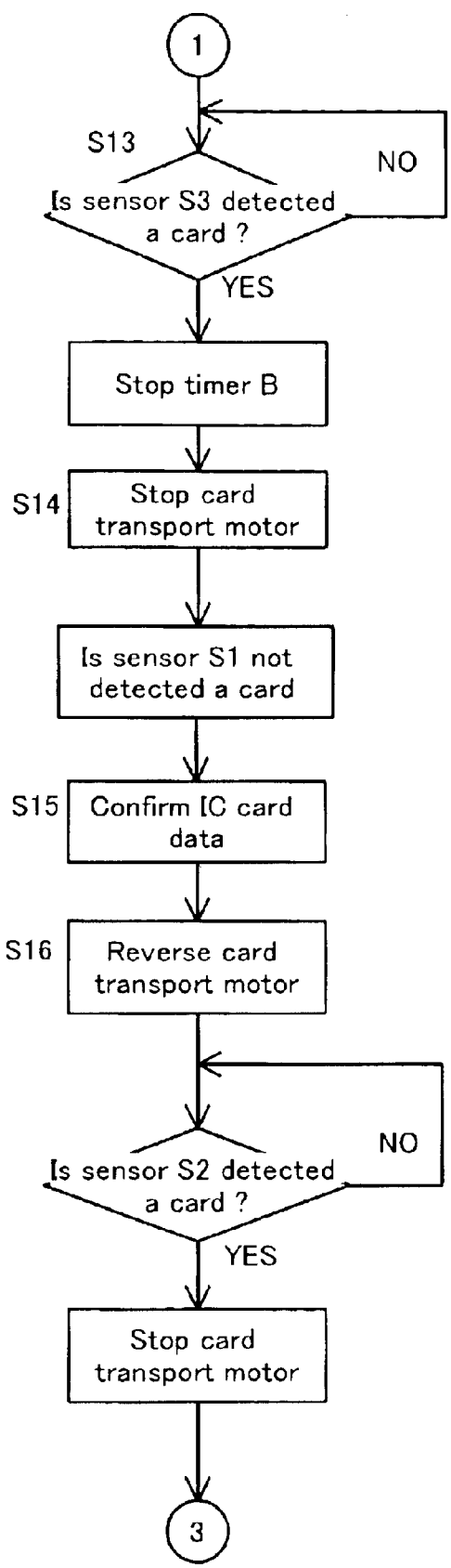
FIG. 8 is a third flowchart of the card processing of an embodiment of the invention.

Card Processing Method:

Next, the card processing method will be explained. FIG. 6 thru FIG. 8 are operation flowcharts of the software that is stored in the ROM for controlling the control unit in FIG. 5, and which is executed by the CPU 47.

(S1) First, initial processing is performed when the power is turned ON by the switch 2 on the power-supply unit. The initial processing checks the function of the RAM 49 memory by reading and writing, and when necessary, performs a sum check of the ROM 48.

(S2) Next, the BUSY flag is set. During diagnosis processing of card device of this embodiment, the BUSY flag is set in order that it is possible to respond to the host computer that the device is BUSY.

(S3) Next, the sensors S2 (14) and S3 (15) are checked, and it is checked whether there is a card inside the card processor by the previous card processing results. When there is a card, processing advances to ④ in FIG. 7 (step S8) and the card motor rotated in reverse to eject the card.

(S4) When the sensors S2 (14) and S3 (15) do not detect a card, the sensor S1 (13) near the card insert port 3 is checked in order to check whether or not there is a card near the card insert port 4. Depending on the result of this check, processing advances to normal processing or to diagnosis processing.

(S5) When the sensor S1 (13) does not detect a card, the previously set BUSY flag is cleared, and normal processing for normal card transaction is performed. In other words, the device waits for a "Read" command from the host computer. When the "Read" command is received, the card insert display lamp 5, indicating that it is okay to insert the card for normal card transaction, lights up.

(S6) The card operator inserts the card after seeing this lamp display. The card device detects that the card is inserted by the sensor S1 (13) and turns OFF the lamp 5, then the card feed motor 25 begins to rotate in the direction that will take in the card. The card is transported in by the rollers 22 to 24.

(S7) In moving to FIG. 7, when the sensor S3 (15) detects the card, the card feed motor 25 stops and the card comes in contact with the card stopper 18 and stops. In this state, the IC terminal 32 of the IC card 31 comes in contact with the contact 16 of the card device. In the card reading process, data transmission is performed with the IC card 31 according to a data "Read" or "Write" command from the computer 7.

In the case of a magnetic card 33, the magnetic head 17 reads the card while it is being fed into the device.

(S8) Next, when a card "Eject" command is received from the computer 7, the card feed motor 25 rotates in the reverse direction, and moves the card in the direction toward the card insert port 4. At this time, as soon as the trailing edge of the card leaves the sensor S2 (14), the card feed motor 25 stops.

(S9) The card is now in a state where it can be removed, and the display lamp 5 flashes to indicated that the operator can remove the card. When the card is removed, the sensor S1 (13) no longer detects the card and the display lamp 5, indicating that the card should be removed, stops flashing and goes OFF. The operation flow is now at step S5 in FIG. 6, and waits for the next "Read" command from the computer 7.

(S10) When the sensor S1 (13) detects a card in step S4, a timer A is started and -the time begins to be counted starting from 0 seconds and the card feed motor 25 begins to operate. When the initial set position of the card is provided at a position where the front end of the card obstructs the sensor S1 (13) but not the sensor S2 (14), it is possible to start diagnosis processing. Also, in the case of a device that reads magnetic data, it is desirable that the operator is able to easily check the set position of the card, without the card being taken in by the drive roller 22 and follower rollers.

When the card is set beforehand in the position of the roller 22, the card is taken into the card device when the card feed motor 25 begins to operate. Moreover, when the card is set in a position where it will not be taken in by the roller 22, the operator must insert the card to where the roller 22 is inserted.

This card operation, or in other words, when the card is set in the position of the sensor S1 (13) before the power is turned ON or when the power is turned ON and is not taken into by the roller 22, it is possible to start the diagnosis function by re-inserting the card when the motor 25 begins to operate, so it is very easy to start the diagnosis function.

(S11)The timer A monitors the time until the card is re-inserted, and when the card is fed in to the sensor S2 (14) within ⌈a⌋ seconds (⌈a⌋ is 1 to 15 seconds for a normal operator, or 10 to 20 seconds for a slower operator), a timer B starts. When the card is not re-inserted to the sensor S2 (14) within ⌈a⌋ seconds, processing returns to step S5, the BUSY flag is cleared and normal card transaction is executed. The value set for time ⌈a⌋ is stored in the ROM 48 memory in the control unit, however, this time can be set to any time which makes it possible for the operator to easily advance to the diagnosis function of this embodiment or to perform normal card transaction. It is best if the time is set within 20 seconds as described above, however it can be set longer than 20 seconds as long as it is possible to select between which processing to perform.

(S12) When reading of data on a magnetic card 33 with magnetic strip is confirmed after timer B starts, magnetic data is read by the magnetic head 17. The reading of magnetic data is performed as follows. The card moves at nearly a constant speed and the digital data processed by the demodulation circuit 46 is read by the control unit 43, and then is stored in the memory 49 and saved temporarily. This magnetic card data is generally frequency-modulated data where the distance of the magnetic flux conversion point is read as a time interval. Reading of this magnetic data is not necessary for an IC card or optical card, and can be omitted from the operation flow.

(S13) Next, moving to FIG. 8, when checking whether the front end of the card in the insertion direction has reached the sensor S3 (15), processing waits until the front of the card reaches the sensor S2 (15). Cyclic checking for a card by this sensor S3 is performed in a short interval of 0.1 msec to 2 msec. When the front end of the card reaches the sensor S3 (15), timer B stops, and the timer value is stored temporarily in a specified memory 49 of the control unit 43.

(S14) Next, after the card feed motor 25 stops, the card is checked whether it is away from the sensor S1 (13). And when is away, "1" is stored temporarily in a specified memory 49 of the control unit 32 and when the card is not away from the sensor S1, "0" is stored as an error. When the card is detected as not being away from the sensor S1 (13), possible causes are that the sensor S1 (13) is obstructed by a lot of dust on the sensor S1 (13) and detects it as being the card, or there is damage to the light emitting portion of the sensor S1 (13) or other circuits. The frequency of this occurring is not high, however it is part of the diagnosis of this embodiment.

(S15) After the card obstructs the sensor S3 (15) and the card feed motor 25 stop rotating forward, the card continues to move forward by inertia until it comes in contact with the card stopper 18 and stops. The stopped position of the card is located where the terminal 32 of the IC card 31 connects with the contact 16 of the card device, so data transmission between control unit 43 and the IC part of the card 31 is possible. When checking the IC-card data, the power supply from the processor 43, the clock signal line, and reset line are connected to the terminal 32 of the IC card 31 and data transmission is performed. The method can be performed such that it complies to the JISX6304 or ISO7816 standards. For example, the simplest method for checking the IC-card data is to check the contents of the card response data by ATR (Answer To Reset) from the card processor, and then by checking whether the check characters are correct or not, it is possible to check whether communication of data between the card device and IC card is proper. This method is valid for at least cards that comply to the JISX6304 or ISO7816 standards, and makes it possible to check for data transmission errors between the processor and IC card when there is poor electrical conduction due to dust, oil or other obstruction between the contact 16 of the processor and the terminal 32 of the IC card, or when there is trouble such as a broken wire in the circuit components of the contact 16 of the processor. When the check results for the IC card are proper, "1" is stored temporarily in the specified memory 49 of the control unit 43, and when there is an error, "0" is stored.

The magnetic card or IC card used in the checks above do not need to be special cards for diagnosis or checking. It is possible to perform the checks with a normal card that is used for cash transactions, or a typical ID card. When a normal transaction card is used, transmission errors may occur due to errors in the card itself. However, as described later with the use of FIG. 11, when data transmission between the card and processor is proper when using another card for general transactions similar to that described above, then it is possible to easily determine that then error is in the card that caused the error. Moreover, when error occurs in the same processor when using many cards, the error can be determined to be in the processor. This method of determining whether the error is in the card or in the processor is only applied to this embodiment, and can also be applied in diagnosis of a device that uses a special diagnosis card.

(S16) Next, the card feed motor 25 is operated in the reverse direction to feed the card in the direction of the card insert port 4. When doing this, as soon as the trailing end of the card leaves the sensor S2 (14), the card feed motor 25 stops, and processing waits for the card to be removed by hand from the sensor S1 (13).

(S17) When it is detected by the sensor S1 (13) that the card has been removed, a timer C starts, and begins counting the time from "0" seconds. The following process is performed in order to obtain the diagnosis results the checks above.

A parity check is performed in character units from of the digital data from the magnetic card that is temporarily stored in the control unit 43, and when the check is proper, "1" is stored in the specified memory 49 of the control unit, and when there is an error, "0" is stored.

The total value from the timer B, or in other words, the time for the card to move from the sensor S2 (14) to the sensor S3 (15) is judged whether it is greater than the minimum preset value. This judgment is for determining the wear of card feed parts such as the motor, belts, and rollers. That is, the roller and card speed are checked whether they are proper by checking the time it takes for the card to move from the sensor S2 (14) to the sensor S3 (15). When the results of the card speed found from the time for the card to move is less than the lower limit value, it is determined that there is an error and "0" is stored in the specified memory 49 of the control unit 43, and when the card speed is normal, "1" is stored. In detail, when the distance between the sensor S2 (14) and the sensor S3 (15) is 80 mm, and the average speed of the card is 320 mm/sec, the average time for moving the card is 0.25 sec. The lower limit is set to 0.2 sec., or −20% the required time. With these values, it is possible to set values that take into consideration the construction, physical characteristics and irregularities of the device.

(S18) After the above process, judgment, "Check Results OK?", is performed for the following four items, and the respective lamp is lit up.

(1) Magnetic card data parity check results Proper: 1, Error: 0

(2) Card feed speed check results Proper: 1, Error: 0

(3) Sensor S1 check results Proper: 1, Error: 0

(4) IC data transmission check results Proper: 1, Error: 0

When an error is determined for one or more item as a result of the four checks above, a lamp diagnosis lamp 8 lights up orange to indicate that the judgment, "Check Results OK?" is "no". When all of the four items are proper a diagnosis lamp 8 lights up green to indicate that the judgment, "Check Results OK?" is "yes".

Figure 6:
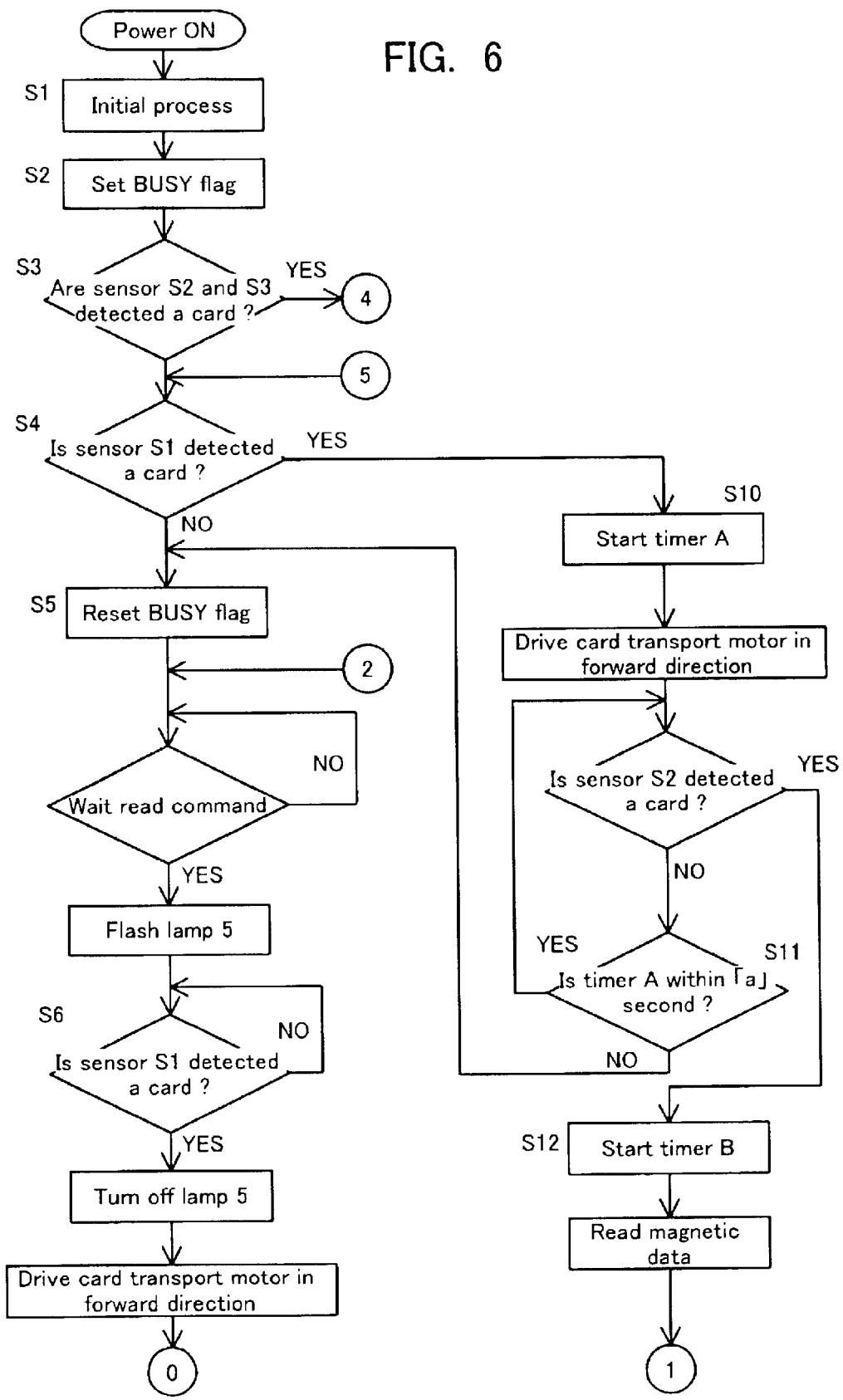
FIG. 6 is a first flowchart of the card processing of an embodiment of the invention.

(Sl9) When this lamp lights up, the timer C is monitored and after ⌈c⌋ seconds have elapsed, the lamp goes OFF and processing returns to step S4 (⑤) in FIG. 6. Monitoring of the timer C is set so the lamp is lit up long enough for the operator to visually check the check results. Normally, the amount of time the lamp is lit up is between 0.5 to 10 seconds.

In this way, it is not necessary to use a special card for inspecting the device, since the sensor S1 detects whether or not there is a card in the card insert port 4 after the power is turned ON and diagnosis processing starts. Also, diagnosis is started without having to perform specific keyboard operations, and it is possible to switch between the flow of normal transaction or diagnosis processing.

Also, after starting diagnosis processing, it is possible to leave the flow of diagnosis and return to the flow of normal transaction. Moreover, it is possible to repeat diagnosis making it possible to simply distinguish between read errors (card error or device error).

Figure 9:
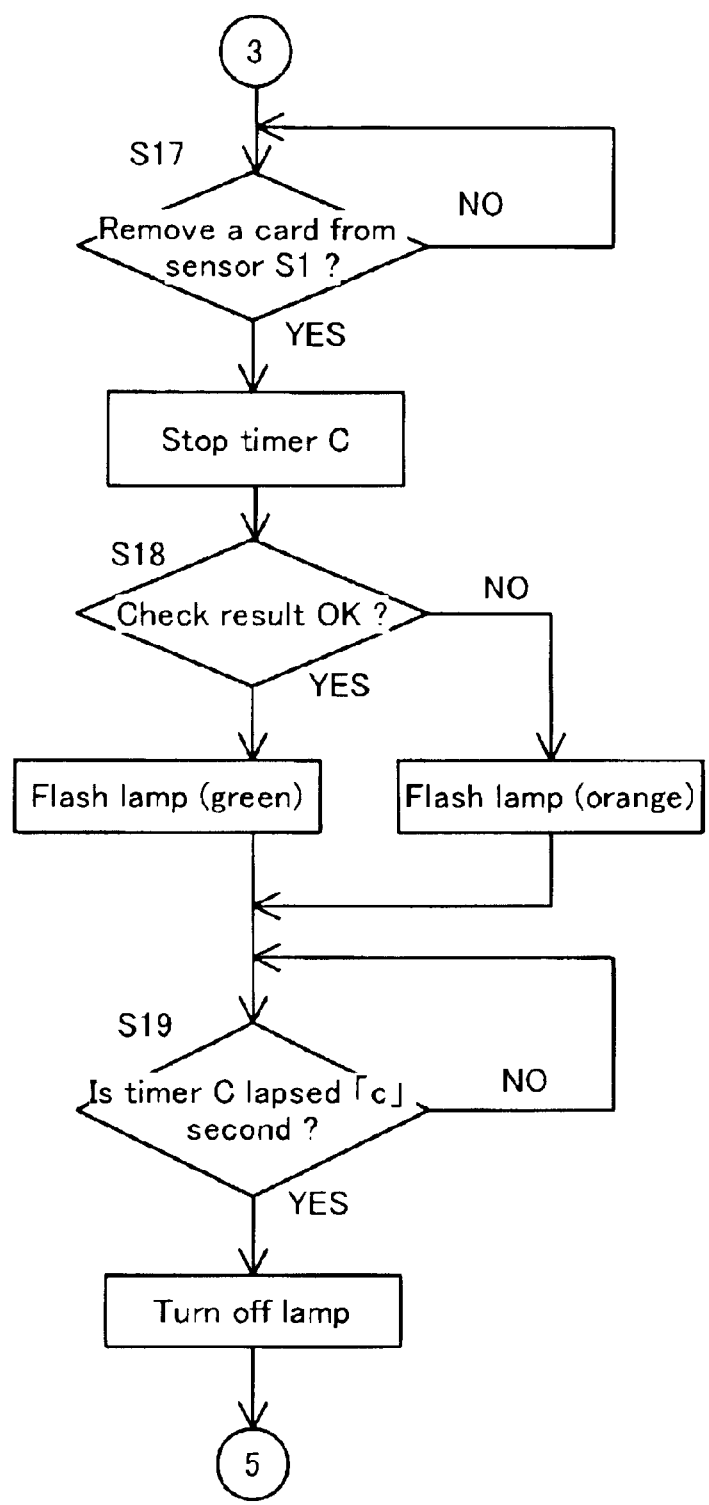
FIG. 9 is a fourth flowchart of the card processing of an embodiment of the invention.
Figure 10:
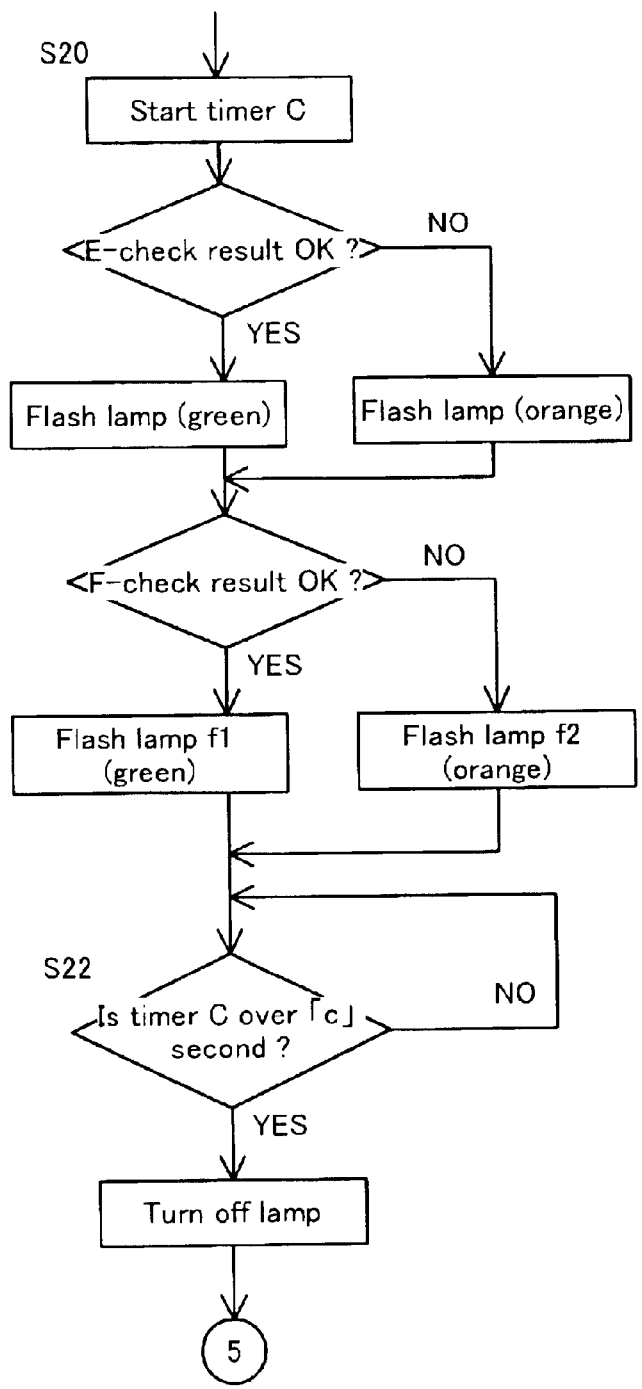
FIG. 10 is a flowchart of the card processing of another embodiment of the invention.

Furthermore, the diagnosis result is displayed so it is easy to check the diagnosis results of the card device. In addition, it is possible to perform device diagnosis easily regardless of the rapid increase of card devices. Other embodiments of the invention:

FIG. 10 is a flowchart showing card processing for another embodiment of the invention. It shows the flow beyond the start of the timer C in FIG. 9, and shows displaying the check results individually. In this example, the diagnosis lamp 8 is comprised of four diagnosis lamps, e1, e2, f1 and f2.

(S20) After the timer C in FIG. 9 starts, the E check result (described later) is checked whether it is OK, and when the result is "yes", the lamp e1 lights up, and when the result is "no", the lamp e2 lights up.

(S21) Similarly, the F check result (described later) is checked whether it is OK, and when the result is "yes", the lamp f1 lights up, and when the result is "no", the lamp f2 lights up.

The aforementioned E check or F check is applied to the (1) magnetic card data parity check, (2) card feed speed check, (3) sensor S1 check, or (4) IC data transmission check. Having an individual lamp e1, e2, f1, f2 for each makes it possible for the operator to check whether there is an error and its cause. If identifiable by the operator, it is possible to use different color lamps instead of different location. When it is desired to have more checks than the two types E, F described above, display lamps can be added.

(S22) Next, the timer C is checked whether ⌈c⌋ seconds has elapsed. Processing waits unit ⌈c⌋ seconds has elapsed, and after it has, the lamp is turned OFF. The lamp e1, e2, f1 or f7 that was lit up, is turned OFF. Also, processing returns to step S4 in FIG. 6.

In this way, when there is a problem with the processor, it is possible to display where the problem is.

Figure 11:
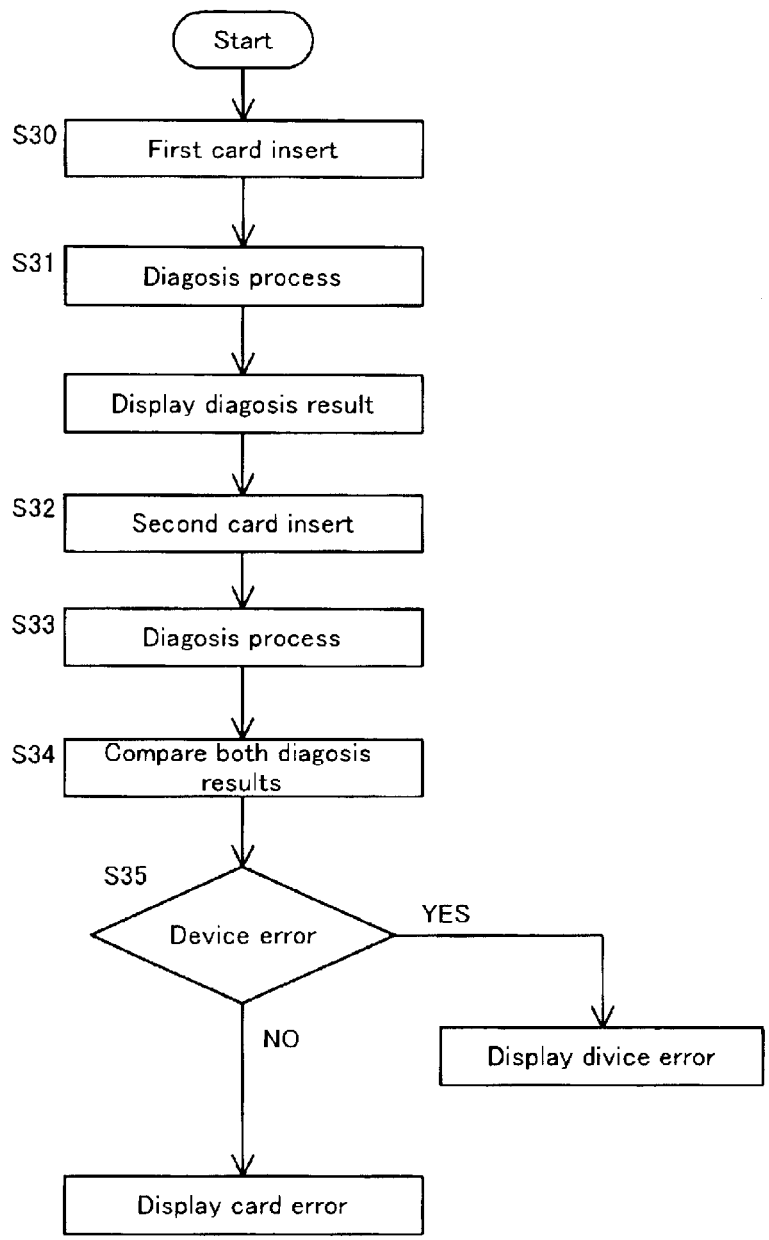
FIG. 11 is a flowchart of the card processing of yet another embodiment of the invention.

FIG. 11, is a flowchart showing card processing of yet another embodiment of the invention, in which a plurality of cards are used to perform diagnosis as explained using FIG. 9.

(S30) A first card is inserted into the card insertion port 4 to start diagnosis.

(S31) By doing this, diagnosis is performed as explained for steps S10 to S19 in FIG. 6, and the diagnosis result is displayed by the lamp. The CPU 47 stores this diagnosis result.

(S32) In order that the operator can find the cause of trouble when the diagnosis result is not OK, a second card that is different from the first card is inserted into the card insert port 4 to start diagnosis.

(S33) By doing this, diagnosis is performed as explained for steps S10 to S19 in FIG. 6, and the diagnosis result is obtained.

(S34) The CPU 47 compares the diagnosis result from step S31 with the diagnosis results from step S33. In this way, when data transmission between the card and device is found to be proper when using a second general transaction card after a transmission error was detected for the first card, it is determined that the error is with the card itself. Moreover, when the first and second cards are used for the same device and the same error occurs, it is determined that the error is with the device. This method of determining whether the error is in the card or in the device is only applicable to this embodiment, and can also be applied in diagnosis of a device that uses a special diagnosis card.

(S35) When the error is processor error, processor error is displayed, and when the error is card error, card error is displayed. This display method is the same as that shown in FIG. 10, and by increasing the number of lamps, the operator can identify the error.

With this method it is possible to diagnose when a data transmission error occurs whether the problem is with the processor or with the card.

The preferred embodiments of the present invention have been explained, however the invention is not limited to these embodiments and can be embodied in various forms within the scope of the present invention.

As described above, the present invention has the following effects:

(1) After the power is turned ON, the sensor S1 detects whether there is a card in the card insert port 4 and starts the diagnosis process, so it is possible to switch the diagnosis start-up operation from normal transaction to diagnosis without the use of a special card for inspecting the card device, or without performing specific keyboard operations.

(2) Therefore diagnosis of a card device for reading from or writing to a card becomes a simple process and does not require operator training.

(3) By using a plurality of cards to perform diagnosis and compare the diagnosis results, it is possible to determine whether errors are processor errors or card errors.

What is claimed is:

1. A card processing device comprising:

a card insert port, means for moving a card, detection means for detecting said card at said card insert port, means for reading data on said card, a switch for turning on power to the device, and a control unit for selectively executing normal processing of moving said card that is inserted from said card insert port and reading the card data, or self-diagnosis processing, for performing diagnosis of the device, wherein said control unit executes self-diagnosis processing when said detection means detects said card when said power switch is turned ON, and executes normal processing when said detection means does not detect said card when said power switch is turned ON.

2. The card processing device of claim 1 wherein, said control unit switches to said normal processing when said card is not fed inside said device ever after a set amount of time elapses after said detection means detects said card.

3. The card processing device of claim 1 wherein, said control unit performs self-diagnosis processing when said detection means at said card insert port detects said card after execution of said self-diagnosis processing, and performs normal processing when said detection means does not detect said card.

4. The card processing device of claim 1 further comprising means for displaying the results of said self-diagnosis processing.

5. A card processing device comprising:

a card insert port, means for moving a card, detection means for detecting said card at said card insert port, means for reading data contained on said card, and a control unit for selectively executing normal processing for moving said card inserted from said card insert port and reading card data and, executing self-diagnosis processing for the device, wherein said control unit determines whether there is device error or card error according to a plurality of diagnosis results from a plurality of different cards.

6. A card processing method comprising:

a step of determining whether detection means that is located in the proximity of a card insert port detects a card, a step of moving said card inserted from said card insert port, reading the card data and performing self-diagnosis of a device when said detection means detects said card, and a step of moving said card inserted from said card insert port, reading the card data and performing normal processing when said detection means does not detect said card.

7. The card processing method of claim 6 wherein, said self-diagnosis step comprises:

a step of switching to said normal processing when said card is not fed inside the processor even after a set amount of time elapses after said detection means detects said card.

8. The card processing method of claim 6 further comprising:
- a step of determining whether or not said detection means at said card insert port detected said card after execution of said self-diagnosing processing, and
- a step of performing said self-diagnosis processing when said card is detected, and for performing normal processing when said card is not detected.

9. The card processing method of claim 6 further comprising a step of displaying the results of said self-diagnosis processing.

10. A card processing method comprising:
- a step of inserting a first card into a card insert port,
- a first diagnosis step of moving said first card inserted into said card insert port, reading the data on said first card and performing self-diagnosis of a device,
- a step of inserting a second card into said card insert port,
- a step of moving said second card inserted into said card insert port, reading the data on said second card and performing self-diagnosis of the device, and
- a step of determining whether there is device error or card error according to the results of said first and second self-diagnosis steps.

* * * * *